May 30, 1967     G. M. FAURE     3,322,980
SUBMINIATURE PRESSURE TRANSDUCER

Filed March 8, 1965     2 Sheets-Sheet 1

INVENTOR
GERARD M. FAURE
BY
Abraham A. Saffitz
ATTORNEY

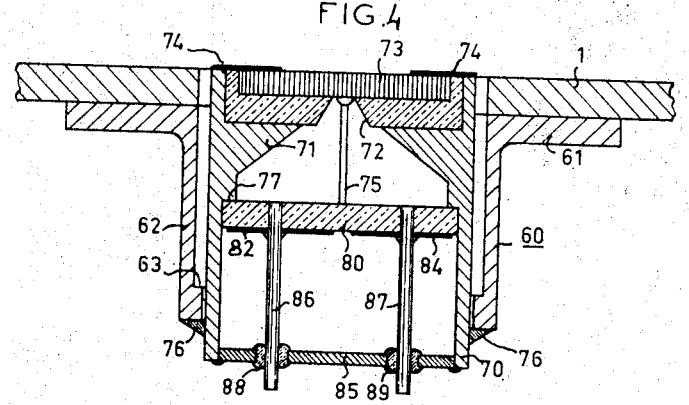
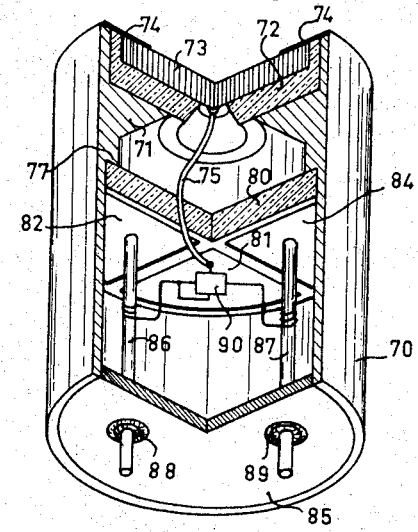
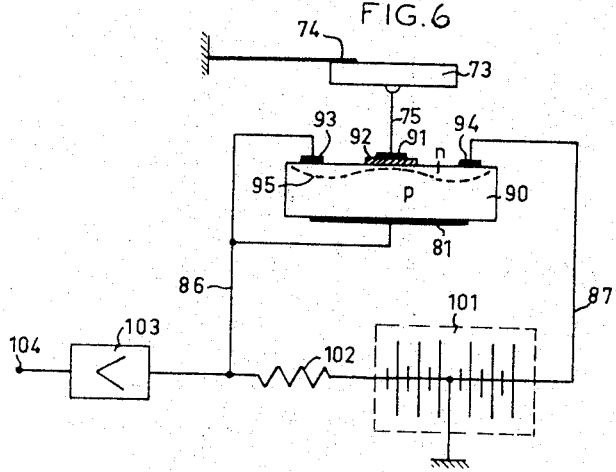

United States Patent Office 3,322,980
Patented May 30, 1967

3,322,980
SUBMINIATURE PRESSURE TRANSDUCER
Gerard M. Faure, Paris, France, assignor to The Office National d'Etudes et de Recherches Aerospatiales, Chatillon-sous-Bagneux, France, a body corporate of France
Filed Mar. 8, 1965, Ser. No. 437,715
Claims priority, application France, Mar. 6, 1964, 966,505; Mar. 1, 1965, 7,508
8 Claims. (Cl. 310—8.7)

The present invention relates to a transducer intended to measure the variable pressures prevailing on the surface of a wall subjected to any forces, for example aerodynamic forces.

It is known to measure the variable pressures prevailing on the wall of a structure by means of plates or flakes of piezoelectric ceramic material which are introduced into orifices in said wall in such a manner that their outside face coincides with the profile of the structure. Nevertheless, the accuracy of these measurements is at the present time limited by serious technical difficulties.

It is in fact known that the useful signal constituted by the difference in potential of the electric charges of opposite signs developed on the two faces of a plate of piezoelectric ceramic material by the pressure applied to them is dependent on the thickness of the plate, but that the parasitic signals due to the accelerations to which it is subjected increase with its mass. In addition, analysis of the distribution of pressures, which is generally not uniform and which may exhibit considerable gradients, is the finer, the larger the number of transducers which can be disposed on the structure to be studied, without substantially modifying the original mass distribution or the original stiffness of its profile. The miniaturisation necessitated by the above considerations leads to an attempt to utilise, for the measurement of variable pressures, piezoelectric flakes of small diameter and slight thickness, which consequently supply useful signals of only very low amplitude. Parasitic signals are superimposed on these signals and may make them useless.

The general object of the invention is to improve the measurement of variable pressures prevailing on the surface of a structure subjected to any forces, for example aerodynamic forces.

One characteristic of the invention is to permit measurement of the variable pressures prevailing on the surface of a structure by means of thin piezoelectric flakes.

Thin piezoelectric flakes are sensitive even to very slight flexion. When the profiles studied are vibrating, local curvatures can envolve harmonically.

A particular object of the invention is to withdraw the piezoelectric plates of pressure transducers from the action of bending forces.

According to the invention, a pressure transducer intended to be introduced into an orifice in a wall for the purpose of measuring the variable pressures prevailing on the outer surface of the latter comprises a thin tubular support having at one end a collar for fixing to the inside surface of said wall coaxially to said orifice, and at the other end a guiding reinforcement of inside diameter slightly smaller than that of said orifice, and a thin sleeve adapted to slide in said guiding reinforcement and reinforced at one end at which a thin piezoelectric flake is mounted, for example a flake of lead zirconiate ceramic material, in an insulating bowl, in such a manner that the outside surface of said flake can be guided exactly in alignment with the outside surface of said wall without mechanical contact between the latter and the flake, which is thus relieved of all direct bending stresses.

Another source of parasitic signals is constituted by the connecting conductors between the pressure transducer, or more precisely the metallised inside face of the piezoelectric flake, and the associated amplifier. As the very high internal impedance of piezoelectric ceramic materials necessitates amplifiers having very high input impedance, it is necessary to screen these conductors in order to prevent them from picking up local electrical parasitic signals, but the variations in capacity between the central conductor and the screening caused by the vibrations give rise to a parasitic signal of the same frequency as the phenomenon studied and generally stronger than the useful signal.

Another particular object of the present invention is to reduce as much as possible the parasitic signals due to the connections between the associated transducers and amplifiers.

According to a first form of construction of a transducer according to the invention, the connecting conductor between the metallised face of the thin piezoelectric flake of said transducer and the associated amplifier is constituted by a first part, composed of bare wire, of suitable length and rigidity to straddle the side wall of the transducer between the centre of said flake, where one of its ends is welded, and the inside surface of the wall on which the transducer is fixed, and to form a bow the natural vibration frequencies of which are outside the field explored, and by a second part constituted by a fine wire enamelled with a thin coating of hard thermosetting resin and stuck to said inside surface by means of a thin coating of thermosetting glue and covered by a metal screen, for example a very thin tape stuck thereto by a glue of the same kind.

According to a preferred embodiment, the input stage of the amplifier associated with a pressure transducer according to the invention is constituted by one or more subminiature transistors of high input impedance which are suitably associated and accommodated inside said transducer, with the result that the connecting conductor between the sensitive element and said input stage is reduced to a length such that the parasitic signals resulting therefrom are negligible.

The reduction of the length of this connecting conductor is likewise advantageous because it reduces its vibrations and also the stresses on the piezoelectric flake used as sensitive element and also the parasitic signals resulting therefrom. Consequently, it would be desirable to produce a subminiature transistor on the actual face of the piezoelectric flake from which these output signals are taken, but an arrangement of this type gives rise to serious difficulties, particularly in connection with the production of a transistor having a sufficiently high input impedance to ensure that the electric charges occurring on said face of the piezoelectric flake will not be substantially altered.

According to the preferred embodiment of the invention, a pressure transducer intended for measuring the pressure prevailing on the wall of a structure comprises an external sleeve fixed by a collar to the inside face of said wall around the periphery of an orifice formed in the latter, and an inside sleeve which carries a piezoelectric flake flush with the outside surface of said wall and which is held coaxially to said external sleeve by a reinforcement carried on the inside face of the latter at the opposite end to said collar, said inside sleeve comprising a disc of ceramic material fixed coaxially near said piezoelectric flake and a field effect transistor disposed on the opposite face of said disc to said piezoelectric flake, said disc being pierced by a hole for the passage of the connection of the control grid of said transistor to said piezoelectric flake and by two holes receiving connecting rods for the source electrode and drain electrode of said transistor.

Another particular object of the present invention is to permit the utilisation of subminiature pressure transducers for measuring heavy pressures.

According to a further embodiment of the invention, said outside sleeve is fluid tight and soldered over its entire periphery to said inside sleeve, so that said transducer has great resistance to pressure supplied to the outside face of said wall and ensures the tightness of the orifice formed in the latter for the passage of said piezoelectric flake.

According to a modification of the invention, in order to avoid the development, for example as the result of unequal thermal expansions, of electrostatic charges between the sensitive flake and the insulating bowl, which would give rise to parasitic signals, the insulating bowl is replaced by a second piezoelectric flake directed in the opposite direction to the first piezoelectric flake, so that the electric charges developed under the action of the pressure on their contacting faces will have the same polarity, said second piezoelectric flake being pierced at its centre in order to permit the passage of the connecting conductor between said sensitive flake and the associated amplifier.

The invention will be better understood on reading the following description and examining the accompanying drawing, in which:

FIGURE 4 is a diagram showing in axial section a transducer equipped according to the present invention to contain a subminiature transistor;

FIGURE 5 is a diagram showing in perspective and partly cut open the arrangement of a field effect transistor in the transducer illustrated in FIGURE 4, and FIGURE 6 is an electric circuit diagram for the transducer illustrated in FIGURE 5.

Figure 1:
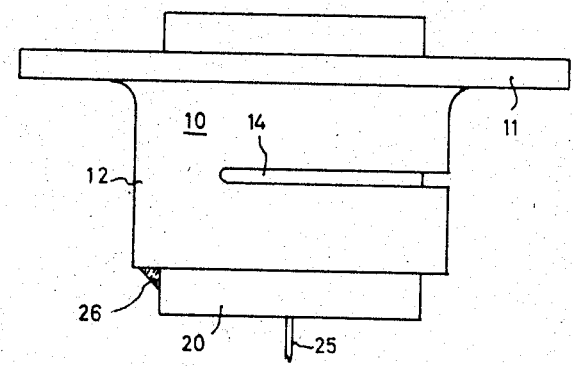
FIGURE 1 illustrates in elevation a pressure transducer according to the invention.
Figure 2:
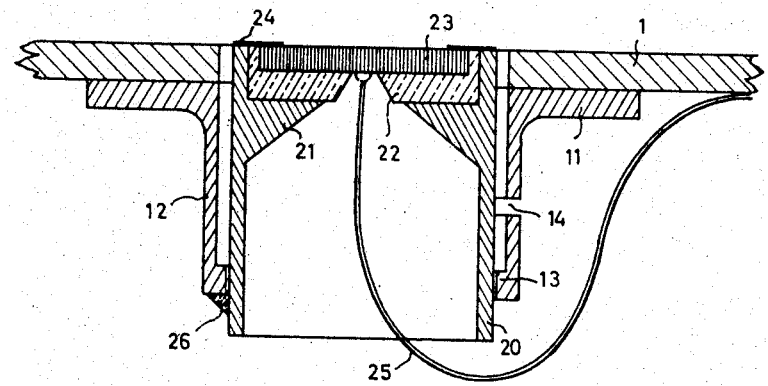
FIGURE 2 is an axial section through the pressure transducer illustrated in FIGURE 1.

The pressure transducer illustrated in FIGURES 1 and 2 on a considerably enlarged scale to ensure that its details will be clearly visible comprises a tubular support 10, for example of brass, and a sleeve 20, which may also be of brass and which carries the sensitive element.

The tubular support 10 is provided with a collar 11 for fastening to the inside surface of a wall 1 of the structure to be studied, and a cylindrical skirt 12 carrying an inside reinforcement 13 at the opposite end to the collar 11. The wall 1 is pierced to match the inside diameter of the collar 11 and the skirt 12. The latter may be provided with a slot over a large circle at a suitable height between the collar 11 and the reinforcement 13, as indicated at 14, over a part of its circumference which may be advantageously be between half and three-quarters.

The sleeve 20 is a piece of thin tubing adapted to slide coaxially to the tubular support 10 in the reinforcement 13. It is provided on the inside, near one of its ends, with a reinforcement 21 in the form of a diaphragm, which increases its transversal rigidity and serves as a support for a cup 22 of highly insulating material mounted and secured by adhesion in the tubular end extending beyond said reinforcement and in which there is mounted and similarly secured by adhesion, for example by means of a thermosetting glue, a thin cylindrical flake 23 of piezoelectric material, for example lead zirconiate, coated with silver on both faces.

It is advantageous to select for the cup 22 a material having a modulus of elasticity at least comparable to that of the metal of which the sleeve 20 is composed, for example a ceramic material.

The upper face of the flake 23 and the edges of the cup 22 are in the same plane as the end of the sleeve 20. The silver coating of the flake 23 is connected to earth by means of a ring of silver paint 24 covering the end of the sleeve 20 and the edges of the cup 22.

In the centre of the bottom face of the flake 23 a wire 25 is welded to the silver coating provided on the latter. The cup 22 is pierced at its centre by an orifice serving to receive the solder spot of the wire 25 and to allow the latter to pass through. FIGURE 2 shows the bow-shaped trajectory of the wire 25 straddling the wall of the sleeve 20 to rejoin the inside face of the wall 1, to which it is secured by adhesion. The wire 25 is extended to the amplifier associated with the transducer by a fine wire screened by means of a simple thin metal tape likewise secured by adhesion to the wall 1 by means of thermosetting glue having a high modulus of elasticity.

This form of construction enables the parasitic signals generally caused by the vibrations of screened cables to be avoided. As the wire 25 is very short, no screening is required and its rigidity is adapted to the field of frequencies to be explored, so that the natural frequencies of the bow are outside this field. As the strength of the current produced by the piezoelectric flake 23 is extremely low, the diameter of the wire extending the conductor 25 may be extremely small and consequently have a very low capacity in relation to its screening, constituted by the conducting wall 1 and the metal tape covering it.

In addition, the very thin coating of thermosetting glue separating it form this screening has a much higher modulus of elasticity than that of usual insulating materials, so that it does not permit any substantial displacement of this conductor, the mass of which is negligible, in relation to the wall 1 and the variations of capacity of the wiring as well as the parasitic signals associated with such variations are practically eliminated.

Figure 3:
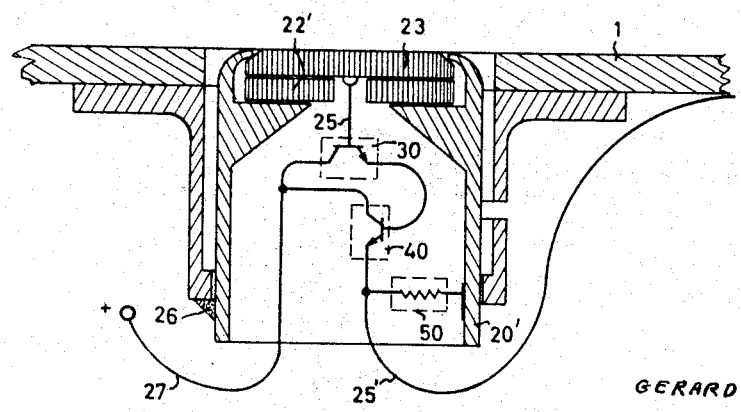
FIGURE 3 is a fundamental diagram of the arrangement of two subminiature transistors inside a pressure transducer according to the invention.

A preferred embodiment enabling cable noise to be eliminated, particularly in cases where the abovedescribed solution is not easily applicable, consists in reducing the conductor 25 to a practically zero length by accommodating in the actual interior of the sleeve 20 an impedance adapter of very high input impedance and of sufficiently small dimensions to be received therein. Impedance adapters complying with these conditions may be formed by subminiature transistors. FIGURE 3 is a basic diagram of an arrangement of this type, comprising two subminiature transistors 30 and 40 of the NPN type and a subminiature resistor 50, inside a transducer similar to the one illustrated in FIGURES 1 and 2, but modified to make it possible also to show an alternative form of this transducer in which, instead of being supported as indicated in FIGURE 2 by an insulating cup 22, the sensitive element 23 is supported by a piezoelectric flake 22'.

The base connection of the transistor 30 is connected to the silver coating on the bottom face of the flake 23 by the conductor 25, the length of which is thus reduced to a minimum. The collectors of the transistors 30 and 40 are connected to a positive potential source by a wire 27. The emitter connection of the transistor 30 is soldered to the base connection of the transistor 40, the emitter connection of which is connected to earth by a charge resistor 50 and to the second stage, of relatively low input impedance, of the amplifier associated with the transducer by a conductor 25' leading to the inside surface of the wall 1 in the same way as the wire 25 in FIGURE 2. The resistor 50 is earthed by soldering to the inside face of the tube 20', which differs from the tube 20 shown in FIGURE 2 only by the method of fastening the flake 23, the latter being laid on the piezoelectric flake 22' and gripped by the top end of the tube 20'. The flakes 23 and 22' are so directed that their contacting faces, which are generally silvered, assume a positive potential under the action of pressure applied to the top face of the flake 23, so that no electrostatic charge can be formed between them. In addition, a thin foil of a conductive metal, such as copper, may be interposed between them in order to improve the electrical contact of their mutually opposite faces, thus ensuring perfect equipotentiality. The conductor 25, which is soldered to the silver coating of the bottom face of the flake 23 or to the copper foil interposed between the two flakes 23 and 22', passes through the latter by an aperture provided at its centre.

In order to place the transducer in position, the collar 11 of the tubular support 10 is fixed by screws or glue to the inside surface of the wall 1 of the structure to be studied, coaxially to an orifice of the same internal diameter which is formed in said wall. A rule is laid on the outside surface and the sleeve 20 is caused to slide in the reinforcement 13 until the top face of the flake 23 comes into contact with said rule, whereupon the sleeve 20 is fastened in relation to tubular support 10 by a solder spot 26.

It is thus possible with great ease to obtain the accurate levelling which is necessary principally for transonic and supersonic flow, in order to avoid boundary layer instability, turbulence, and detachment, and which was obtained in the prior art, in which pressure transducers were dimensioned in dependence on the thickness of the wall to be equipped, only by long and delicate corrections by means of shims.

It may further be observed that the flake 23 is very effectively protected against any bending stress which would have the effect of producing, even in the case of very slight bending, a very strong parasitic signal at the same frequency as the useful signal. In fact, the bending of the wall 1 at the place where the transducer is installed, when communicated to the skirt 12 which is very thin, produces only a slight deformation of its bottom part which is reinforced at 13, and the residual ovalisation of the reinforcement 13, transmitted to the bottom part of the thin sleeve 20, affects the top part of this sleeve practically not at all because of the presence of the reinforcement 21 in the form of a diaphragm. Experience has shown that the slot 14 completely eliminates any bending of the flake 23 and the parasitic signals which would result therefrom.

The performance of a pressure transducer according to the invention, utilising as sensitive element a flake of lead zirconiate ceramic material and having a diameter of 4 mm. and a thickness of 0.4 mm., is described below by way of example without limitation.

A transducer of this type, the total weight of which is 0.5 g., is insensitive to the bending of the support and has a threshold of sensitivity of 100 Pascals, that is to say 1 g. per square cm. The parasitic signals due to the vibration to which it is subjected remain below one quarter of this threshold, that is to say practically at the background noise level of a conventional amplification chain, while accelerations do not exceed 20 G.

The inside sleeve 70 illustrated in FIGURE 5 is intended to be inserted, as shown in FIGURE 4, into an outside sleeve 60 provided on the one hand with a collar 61 for fixing to the inside face of the wall 1, and on the other hand with a guiding reinforcement 63, and then to be soldered to the latter either over its entire periphery or by one or more spots 76, depending on the range of pressures to be measured to which the structure of the body 62 of the sleeve 60 is adapted.

For low pressures, it is advantageous to split the sleeve 60 over part of its width and to solder the inside sleeve 70 only along the median generatrix of the part of the sleeve 60 which is not cut, as indicated by FIGURES 1 and 2, or else to reduce the cylinder 62 to a few legs perpendicular to the wall 1 so as to reduce as much as possible the transmission to the sleeve 70 of bending deformation of said wall. If on the contrary the transducer is to be subjected to high pressure, the wall 62 of the sleeve 60 may be continuous and if desired reinforced, and the sleeve 70 is soldered over its entire periphery, thus restoring tightness, which is often advantageous, between the two faces of the wall at the point where the transducer is installed.

The sleeve 70 is provided on the inside, near one of its ends, with a reinforcement 71 in the form of a diaphragm, which serves as a support on the one hand for an insulating cup 72, for example of ceramic material, carrying a flake of piezoelectric ceramic material 73 silvered on both faces, as in the embodiment shown by FIGURES 2 and 3, and on the other hand, by a shoulder 77, as support for a disc 80 of ceramic material the diameter of which is adjusted to the inside diameter of the sleeve 70. The disc 80 is coated with gold on the opposite face to the flake 73, with the exception of its periphery and of two perpendicular diametral grooves which divide its surface into four conductor sectors 81 to 84, which are insulated from one another and from the sleeve 70. The sector 81 serves as support for a subminiature field effect transistor 90, which is for example soldered to its surface. The disc 80 is pierced with three holes passing respectively through the other three sectors, one of them allowing the passage of a connection 75 which connects the inside silvered face of the flake 73 to the control grid of the transistor 90, while the other two have forced into them two small conductive rods 86 and 87 which are connected electrically by soldering to their respective sectors, for example 82 and 84, and are connected to the source and drain electrodes of the transistor 90. A metal disc 85 soldered to the opposite end of the sleeve 70 to the flake 73 is traversed by the rods 86 and 87 in fluid-tight outlets constituted for example by soldered glass beads 88, 89. The disc 85 thus ensures the tightness of the sleeve 70, preventing any penetration of moisture which would be liable to impair the electrical insulation of the electrodes of the transistor 90, and constitutes additional screening of the connection 75.

FIGURE 6 shows by way of non-limitative example the electrical circuit arrangement of a field effect transistor 90 of known type. This transistor has in a thin silicon plate a junction 95 between a P type region and an N type region, the latter having been made by gaseous diffusion of a suitable significant impurity after masking the central portion of the plate by a very thin silica layer 92 so as to limit locally the depth of the diffusion to a very low value, and a control grid electrode 91, a source electrode 93, and a drain electrode 94 which are deposited respectively on the silica layer 92 and on each side of the latter in ohmic contact with the surface of the N type region. The conductor 75, which is soldered to the insulated silvered face of the piezoelectric flake 73, is connected to the control grid 91, so that the signals supplied by the flake 73 modulate, at the narrowest part, the N type channel connecting the source electrode 93 and the drain electrode 94. Said electrodes are respectively connected, in the case of the former to the negative terminal of a source 101 through the medium of a resistor 102 and to the input of an amplifier 103 at the output 104 of which the amplified signals are collected, and in the case of the latter to the positive terminal of the source 101, the centre point of which is earthed. The transistor 90 may be soldered to the gold-coated sector 81 and the latter connected to the source electrode so that the portion of the sector 81 which carries the transistor 90 constitutes a reaction grid.

What I claim is:

1. A piezoelectric transducer for measuring variable pressures prevailing on the outer surface of a wall of a structure provided with an orifice of a given diameter, said transducer comprising a thin tubular support having at one end a collar for fixing to the inside surface of said wall coaxially to said orifice, said collar having an inside diameter equal to said given diameter, at the other end a guiding reinforcement of inside diameter slightly smaller than said given diameter; a sleeve adapted to slide coaxially in said guiding reinforcement and internally reinforced near one of its ends by a diaphragm; a thin piezoelectric flake mounted at said end of said sleeve and supported by said diaphragm through the medium of an insulating annular support, whereby said flake can be accurately guided and fixed in line with the outside surface of said wall without contact between said wall and said flake which is thus relieved of all bending stresses.

2. A piezoelectric transducer for measuring variable pressures prevailing on the outer surface of a wall of a structure provided with an orifice of a given diameter, said transducer comprising a thin tubular support having at one end a collar for fixing to the inside surface of said wall coaxially to said orifice, said collar having an inside diameter equal to said given diameter, at the other end a guiding reinforcement of inside diameter slightly smaller than said given diameter; a sleeve adapted to slide coaxially in said guiding reinforcement and internally reinforced near one of its ends by a diaphragm; a thin piezoelectric flake mounted at said end of said sleeve and supported by said diaphragm through the medium of an insulating annular support having a modulus of elasticity at least equal to that of the material constituting said sleeve; a conductive coating on the face of said flake bearing on said insulating annular support; and an output connecting conductor soldered to the center of said conductive coating and passing through the central aperture of said insulating annular support.

3. A piezoelectric transducer for measuring variable pressures prevailing on the outer surface of a wall of a structure provided with an orifice of a given diameter, said transducer comprising a thin tubular support having at one end a collar for fixing to the inside surface of said wall coaxially to said orifice, said collar having an inside diameter equal to said given diameter, at the other end a guiding reinforcement of inside diameter slightly smaller than said given diameter; a sleeve adapted to slide coaxially in said guiding reinforcement and internally reinforced near one of its ends by a diaphragm; a first and a second piezoelectric flake, said first piezoelectric flake being mounted at said end of said sleeve and supported by said diaphragm through the medium of said second piezoelectric flake, said first and second piezoelectric flakes having their contacting faces silvered and being directed in opposite directions so that the electric charges developing under the effect of pressure on said contacting faces will be of the same polarity, said second piezoelectric flake being pierced at its center by an orifice and said first piezoelectric flake being provided at the center of its silvered face with an output connecting conductor passing through the central orifice of said second piezoelectric flake.

4. A piezoelectric transducer for measuring variable pressures prevailing on the outer surface of a wall of a structure provided with an orifice of a given diameter, said transducer comprising a thin tubular support having at one end a collar for fixing to the inside surface of said wall coaxially to said orifice, said collar having an inside diameter equal to said given diameter, at the other end a guiding reinforcement of inside diameter slightly smaller than said given diameter; a sleeve adapted to slide coaxially in said guiding reinforcement and internally reinforced near one of its ends by a diaphragm; a thin piezoelectric flake mounted at said end of said sleeve and supported by said diaphragm through the medium of an insulating annular support; a conductive coating on the face of said flake bearing on said insulating annular support; at least one subminiature transistor accommodated inside said sleeve and a connecting conductor between the center of said conductive coating and the control electrode of said transistor.

5. A piezoelectric transducer adapted to be inserted in an orifice of a wall of a structure for measuring variable pressures prevailing on the outer surface of said wall and comprising a thin tubular support having at one end a collar for fixing to the inside surface of said wall coaxially to said orifice, at the other end an inside guiding reinforcement; a sleeve adapted to slide coaxially in said guiding reinforcement to be accurately driven in line with said outer surface and internally reinforced near one of its ends by a diaphragm; a thin piezoelectric flake mounted at said end of said sleeve and supported by one side of said diaphragm through the medium of an insulating annular support; a conductive coating on the face of said flake bearing on said insulating annular support; a connection soldered to the center of said conductive coating; a disc of ceramic material fixed coaxially in said sleeve against the other side of said diaphragm and pierced by a first hole for the passage of said connection; a field effect transistor disposed on the opposite face of said disc to said diaphragm and having its grid electrode connected to said connection; and conductive rods respectively connected to the source electrode and to the drain electrode of said field effect transistor and fixed into second and third holes of said disc.

6. A piezoelectric transducer according to claim 5 in which said conductive rods pass through fluid-tight, insulated outlets in a metal disc closing the opposite end of said sleeve to said piezoelectric flake.

7. A piezoelectric transducer according to claim 2 in which said connecting conductor is constituted by a first unscreened portion of suitable length and rigidity to straddle the side wall of said sleeve between the center of said flake where one of its ends is soldered and said inside surface of said wall and to form a bow the natural vibration frequencies of which are outside the field explored, and a second part constituted by a fine wire enamelled with a thin layer of hard thermosetting resin adhesively secured to said inside face by means of a thin layer of thermosetting glue and covered by a very thin metal tape adhesively secured with a glue of the same kind.

8. A piezoelectric transducer according to claim 1 in which said tubular support is fluid-tight and soldered over its entire periphery to said sleeve whereby said transducer has great resistance to pressure supplied to said outer surface of said wall and ensures the tightness of said orifice.

References Cited
UNITED STATES PATENTS

| | | | |
|---|---|---|---|
| 3,146,360 | 8/1964 | Mashill | 310—8.7 |
| 3,294,988 | 12/1966 | Packard | 310—8.7 |

MILTON O. HIRSHFIELD, *Primary Examiner.*

J. D. MILLER, *Assistant Examiner.*